UNITED STATES PATENT OFFICE.

JOHANN JAKOB BRACK, OF BASLE, SWITZERLAND, ASSIGNOR TO FIRM OF BASLE CHEMICAL WORKS, OF BASLE, SWITZERLAND.

PROCESS OF MAKING PHTHALEIN DYES.

SPECIFICATION forming part of Letters Patent No. 695,441, dated March 18, 1902.

Application filed December 17, 1901. Serial No. 86,230. (No specimens.)

*To all whom it may concern:*

Be it known that I, JOHANN JAKOB BRACK, chemist, a citizen of the Swiss Republic, residing at Basle, Switzerland, have invented new and useful Improvements in the Manufacture of Fast Dyestuffs of the Phthalein Series, of which the following is a complete and clear specification.

According to the English Letters Patent No. 4,985 of 1895 and United States Letters Patent No. 578,578, unsymmetrical dialkylrhodamins are formed by heating dialkylamidoöxybenzoylbenzoic acid or (according to the said English Letters Patent) its alkylesters with meta-amido-phenols in a solution of sulfuric acid during several hours up to 130° to 160° centigrade. In this manner dyestuffs are obtained which can only be transformed into sufficiently fast products by subsequent heating with alcohol and hydrochloric acid or sulfuric acid, (United States Letters Patent No. 584,119 and English Letters Patent No. 4,985 of 1895, claim 4.)

We have now found that under suitable conditions it is possible to condense an ester of dialkylamidoöxybenzoylbenzoic acid directly to rhodamin-esters with meta-amido-phenols. The most suitable condensing fluid for this purpose is a mixture of methylsulfuric acid and sulfuric acid, (mixture of sulfuric acid monohydrate and methylic alcohol.)

Whereas dilute or concentrated sulfuric acid saponify the ketonic acid-ester before the condensation takes place, such a mixture has an exclusively condensing effect, for even the formed rhodamin-ester is not further changed by it. For this purpose it is not necessary to isolate the ketonic acid-ester. The second component may be added directly to the esterification mixture, whereupon by heating to over 100° the formation of the rhodamin-ester takes place. By substituting a mixture of sulfuric acid monohydrate and alcohol in place of dilute sulfuric acid the manufacture is therefore simplified, seeing that in this manner the production of fast unsymmetrical rhodamin dyes in a single operation becomes possible.

Example: Into a mixture of three hundred and sixty kilos of sulfuric acid monohydrate and eighty kilos methylic alcohol are introduced fifty-six kilos diethylamidoöxybenzoylbenzoic acid and then heated to about 100° centigrade while stirring. After a short time solution takes place with formation of the ester of the already-mentioned ketonic acid, which ester distinguishes itself in a characteristic manner from the starting matter by its insolubility in sodium carbonate. Twenty-four kilos of ortho-amido-para-cresol

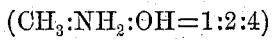

are then stirred in, and the reaction mixture is heated to over 100° centigrade until no more diethylamidoöxybenzoylbenzoic acid ester is detectable. (Too much prolonged heating is to be avoided, as in that case more bluish and less valuable shades are easily formed.) For the purpose of ascertaining the end of the reaction a test is poured into water and the precipitated rhodamin-ester is removed by a filter. It is completely soluble in hot water, whereas any still present ketonic acid-ester is only very little soluble and remains on the filter as a white crystalline powder. After heating for two hours to about 140° or during a short time to 160° the condensation is completed, and by pouring into water the sulfate of the rhodamin-ester separates in the form of a brilliant-green crystalline precipitate. This is removed by a filter, dissolved in hot water, and the rhodamin-ester precipitated as hydrochloric salt by adding eighty kilos of hydrochloric acid.

The obtained dyestuff contains a free amido group and accordingly supplies a diazo compound from which—for instance, by coupling with alpha-naphthol—a blue-violet dyestuff is obtained.

In the specified example diethylamidoöxybenzoylbenzoic acid may be replaced by dimethylamidoöxybenzoylbenzoic acid or another dialkylamidoöxybenzoylbenzoic acid.

All the dyestuffs obtained according to this invention possess in the form of their hydrochloric salts the same qualities as the dyestuff of the United States Letters Patent No. 584,119—i. e., they form fine green crystals, which are soluble in water and alcohol with a fine red tint. The watery solution of the ester of unsymmetrical diethylrhodamin obtained according to the example is hardly fluorescent at all, while that of the ester of the corresponding unsymmetrical dimethylrhodamin shows a slight yellow fluorescence. Their alcoholic solutions possess a stronger yellowish fluorescence. In concentrated sulfuric acid the products are soluble with a yellow tint, which turns into red on addition of water. They dye cotton and wool mordanted with tannin and tartar emetic in lively red tints, which, however, are of a much bluer shade than those produced by the esters of the corresponding symmetrical dialkylrhodamins. As stated above, these products possess a primary amido group, which can be diazotized. In the specified example the orthoamidoparacresol may be replaced by another metaamidophenol, as ethylmetaamidophenol, methylmetaamidophenol, &c.

What I claim is—

1. A process for the manufacture of fast dyestuffs of the phthalein series by heating one molecule of an alkyl-ester of a dialkylamidoöxybenzoylbenzoic acid with one molecule of a metaamido-phenol in a mixture of sulfuric acid and methylsulfuric acid.

2. The described process for the manufacture of fast dyestuffs of the phthalein series by heating to over 100° centigrade one molecule of an alkylester of a dialkylamidoöxybenzoylbenzoic acid with one molecule orthoamidoparacresol in a mixture of sulfuric acid and methylsulfuric acid.

In witness whereof I have hereunto signed my name, this 5th day of December, 1901, in the presence of two subscribing witnesses.

JOHANN JAKOB BRACK.

Witnesses:
GEORGE GIFFORD,
AMAND RITTER.